264-197

SEARCH ROOM

United States Patent Office

Re. 26,613
Reissued June 24, 1969

26,613

HIGH TENACITY RAYON YARN PRODUCTION

Geert Antema, Tietso Kuipers, and Johannes J. M. Mulderink, Arnhem, Netherlands, assignors to American Enka Corporation, Enka, N.C., a corporation of Delaware No Drawing. Original No. 3,364,290, dated Jan. 16, 1968, Ser. No. 318,838, Oct. 25, 1963. Application for reissue May 14, 1968, Ser. No. 729,136
Claims priority, application Netherlands, Oct. 30, 1962
Int. Cl. D01f *3/28*
U.S. Cl. 264—197 8 Claims

Matter enclosed in heavy brackets [ ] appears in the original patent but forms no part of this reissue specification; matter printed in italics indicates the additions made by reissue.

ABSTRACT OF THE DISCLOSURE

Manufacture of high tenacity rayon yarns comprising the process of extruding a viscose containing a skin-producing modifier [and a cation-active compound which counteracts the occurrence of spinning faults] into a spin bath containing sulfuric acid, sodium sulfate and zinc sulfate, stretching the yarn in a hot dilute acid bath, adjusting the yarn to a pH of from 5 to 8.5, collecting the yarn in the form of a cake, unwinding the yarn from the cake, after-stretching and drying the yarn for a maximum of 20 minutes.

This invention relates generally to the production of rayon filamentary materials suitable for use as reinforcement in tires, belts and other rubber articles and more particularly to a process for producing extra high tenacity threads, yarn, and cord and regenerated cellulose.

The known process for producing high tenacity regenerated cellulose threads, yarn and cord, hereinafter referred to collectively as yarn, comprises extruding a viscose in the presence of a skin-producing modifier, into a spinning bath containing sulfuric acid, sodium sulfate, and 3 to 10% by weight of zinc sulfate, stretching the freshly spun yarn in a hot bath containing dilute acid, collecting and winding the stretched yarn in package form, and drying the yarn in the package or unwinding and drying it continuously. The thus produced yarn has a high tenacity, each filament having a high skin structure when viewed in cross section.

It has been found that rayon yarn of even higher tenacity than that produced by the aforementioned process is desirable for many present day applications. In this respect then, while the known high tenacity yarn is generally good, it is necessary that even higher tenacity yarn be produced.

Accordingly, it is an object of this invention to provide a process for producing rayon yarn having improved properties.

Another object of this invention is to provide a process for producing extra high tenacity rayon yarn.

Still another object of this invention is to provide a process for producing extra high tenacity yarn of regenerated cellulose that can be carried out in conjunction with the known process with a minimum of additional steps and attendant expense.

These and other objects will become more apparent from the following detailed description.

In accordance with the present invention, extra high tenacity rayon yarn is produced by modifying the aforementioned known process with two critical steps. In essence, this comprises adjusting the extruded yarn to a pH of 5 to 8.5 after stretching in the hot acid bath and before winding, followed by limiting the drying process to a maximum of 20 minutes.

There are several methods of adjusting the freshly spun wet yarn to a pH of 5 to 8.5. A very simple method consists in washing the running wet yarn with water. If water is used having a temperature of 13° C. or higher, then it is preferred to prolong the treatment of the wet yarn until they no longer contain salts and the pH of the yarn is about 7. If cold water is used, i.e., 12° C. or lower, then the wet yarn need not be treated until it is free from salts.

The pH of the yarn is determined as follows: 200 cc. distilled water is poured over 6 grams of the wet yarn (containing about 100% moisture) in a beaker. The yarn is allowed to stand in the beaker for one hour, with occasional shaking, after which the pH of the liquid is measured, thereby determining the pH of the yarn.

In addition to water, the treatment of the wet yarn can be carried out with an aqueous salt solution such as sodium carbonate, sodium bicarbonate, or sodium sulfate. An aqueous solution of ammonia may also be used. If the temperature of the washing liquid is 12° C. or lower, then the yarn need not be washed as thoroughly as when the temperature is 13° C. or higher. The treatment of the wet yarn with water, salt-containing water, or ammoniacal water may be carried out by passing the yarn through a bath. As pointed out above, however, it is critical that this step be carried out before the yarn is wound and collected in package form. Alternately, the liquid can be sprayed on the godet over which the yarn is passed to the collecting device.

After the wet yarn has been treated so that its pH is from 5 to 8.5, it is collected in a yarn package such as in a spinning pot, perforated basket, or on a spool. It is thereafter dried and, as mentioned above, the drying process must not last longer than 20 minutes. A drying period of any longer duration has a very unfavorable influence on the tenacity of the yarn. Drying may be carried out by several ways, such as by placing the wet yarn package in a high-frequency electric field, or by unwinding the wet yarn from the package and drying it with hot air while traveling through a drying tunnel. It also may be done by passing the wet yarn over a hot roller.

The yarn should be kept under tension during drying. This may be effected in various ways. After treatment with the washing liquid, the wet yarn may be wound under tension on a spool and the yarn package dried in a high-frequency field. Also, after the treatment with the washing liquid, the running wet yarn can be guided under tension through a drying tunnel or over a hot roller. In an alternate system, the wet yarn may be unwound from a yarn package, after-stretched, and subsequently dried.

In a typical process according to the invention, a viscose is spun in the presence of at least one compound which will produce a skin structure in the threads. For the sake of brevity, such compounds are hereinafter referred to as modifiers. The modifier may be present in the viscose or in the spin bath, or in both. A number of known modifiers can be used in the process, such as amines, quaternary ammonium compounds, carbaminates, polyethylene glycol, and ethers having the formula $RO(CH_2CH_2O)_nR'$, where R is an alkyl or aryl group, R' is hydrogen, an alkyl or aryl group, and n is 1–4 incl. Specific examples of amines are cyclohexylamine, quinoline, ethylene diamine, hexamethylene diamine, dipropylene triamine, dodecylamine, and dibutylaminopropylamine. Examples of quaternary ammonium compounds are benzyltrimethylammonium hydroxide, tetraethylammonium hydroxide, tetraethylammonium bromide, tetraethylammonium iodide, and tributylpropylammonium peroxide. Representative carbaminates are sodiumcyclohexyldithiocarbaminate, sodium-phenyldithiocarbaminate, sodium-morpholyl-N-dithiocarboxylate, and sodium-cyclohexylmonothiocarbaminate. The polyethylene glycol may have an average molecular weight of 200 to 4,500. Examples of ethers are phenoxyethanol, ethoxyethanol, methoxyethoxyethanol, and butoxyethoxyethanol. The modifiers may be used singly or in combination.

For best results, it is also preferred to spin the viscose in the presence of a compound which counteracts the occurrence of spinning faults. These are usually cation-active compounds, for example, laurylpyridinium chloride, stearylpyridinium chloride, dodecyltriethylammonium iodide, and compounds having the formula:

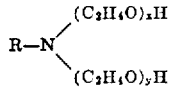

where R is an alkyl group having 8 to 24 carbon atoms, x and y are at least 1, and x+y is 5 to 25. Preferably, a viscose is used containing the last mentioned compound in combination with polyethylene glycol. The viscose contains each of these two substances in amounts of at least 0.5% by weight, based on the cellulose in the viscose, with the nitrogen compound being derived from soy bean oil, coconut oil, or tallow and where x plus y is about 12.

When using these two compounds in combination, the yarn obtained has optimum strength if the viscose employed has a cellulose content of 6 to 8% by weight, a total alkali content of 5 to 6% by weight, and a Hottenroth maturity index of 13 to 18. The viscose should then be extruded into a spin bath maintained at 40 to 60° C., having a sulfuric acid content in percent by weight which is 0.83 to 0.95 times the total alkali content in percent by weight of the viscose, a sodium sulfate content of 11 to 15% by weight, and a zinc sulfate content of 3 to 5% by weight. The yarn is then successively stretched about 100% in a dilute sulfuric acid bath maintained at about 95° C., washed with water until it is free of acid and salts, and collected in the form of a cake in a spinning pot. The yarn is then unwound from the cake and after-stretched about 10%. It is subsequently dried on a hot roller and thereafter wound in package form.

To further illustrate the invention, the following examples are given. However, the invention is not intended to be limited thereby. All percentages are by weight unless otherwise stated.

Example I

A viscose is prepared having a cellulose content of 7.3%, a total alkali content of 5.5%, a viscosity of 110 seconds (ball fall method), and containing 1.5% by weight (based on the cellulose in the viscose) of polyethylene glycol having an average molecular weight of 3,000, and 1.5% by weight (based on the cellulose in the viscose) of a compound having the formula:

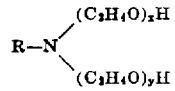

where R is an alkyl radical derived from coconut oil, and x+y is 12. The viscose was aged to a γ-number of 45 and a Hottenroth maturity index of 15 and spun into a bath maintained at 50° C. containing 4.9% sulfuric acid, 13% sodium sulfate, 4.5% zinc sulfate, 0.004% laurylpyridinium chloride, and 0.025% of a compound having the formula:

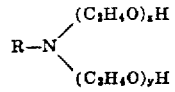

where R is an alkyl radical derived from coconut oil, and x+y is 12. The spinneret had 1,000 orifices, each having a diameter of 60μ. The yarn emerging therefrom was guided through a tube immersed in the spin bath which consisted of two cylindrical sections, one section (near the spinneret) having an inner diameter of 16.5 mm. and the second having an inner diameter of 20 mm.

The yarn was taken up by means of a godet at 30 m./min.

After the yarn had left the spin bath, it was passed through a second bath maintained at 95° C. containing 2.5% sulfuric acid, 1% sodium sulfate, and 0.5% zinc sulfate. In this bath the yarn was stretched 100% by means of a second godet, the speed of which was twice that of the first godet. Water at 30° C. was sprayed on the second godet. After the yarn had left the second godet, it had a pH of 7.5 and was collected in a spinning pot. It had obtained a twist of 100 S turns per meter. The thus produced yarn was then drawn off the cake in the wet state and guided through a water bath containing 3% liquid paraffin, 0.3% butyl stearate, and 0.4% sulfated peanut oil. In this bath the yarn was after-stretched about 10% and then dried in half a minute by guiding it, under tension, over a hot roller. The resulting yarn had a denier of 1,650 and was wound onto a spool.

The yarn was conditioned in air at 20° C. and 60% relative humidity and had a strength of 9.6 kg. Desulphurization, washing and drying of the yarn did not produce any decrease in strength. Thereafter, the yarn was twisted 470 S turns per meter. Two such yarns were plied together with 470 Z turns per meter to produce a tire cord that had, in the conditioned and bone-dry state, a strength of 15.1 and 18.5 kg., respectively.

Example II

The process of Example I was repeated, except that the yarn was not treated with water on the second godet. After the yarn had been collected in the spinning pot, it was desulphurized and washed. Subsequently, the yarn was after-stretched by about 10% in the sizing bath and then dried. The conditioned strength of the yarn was 8.2 kg., considerably lower than that of the yarn obtained in the process described in Example I. The conditioned strength and the bone-dry strength of tire cord made from two such yarns were 13.5 and 15.9, respectively.

Example III

The process of Example I was repeated, except that on the second godet the yarn was sprayed with water at 12° C. After the yarn had been collected in the spinning pot, it was successively desulphurized, washed, after-stretched by about 10% in the wet state, dried on a hot roller, and wound. The conditioned strength of the yarn was 9.6 kg. The conditioned strength and the bone-dry strength of tire cord made from two such yarns were 15.0 and 18.4 kg., respectively.

Example IV

The process of Example I was repeated, except that on the second godet the yarn was sprayed with an aqueous sodium bicarbonate solution until it reached a pH of 8.5. After the yarn had been collected in the spinning pot, it was successively desulphurized, washed, after-stretched by about 10% in the wet state, dried on a hot roller, and wound. The conditioned strength of the yarn was 9.5 kg. The conditioned strength and the bone-dry strength of the tire cord made from two such yarns were 15.1 and 18.4 kg., respectively.

Example V

The process of Example I was repeated, except that the viscose contained 2% by weight (based on the cellulose in the viscose) quinoline and 1% by weight (based on the cellulose in the viscose) of a compound having the formula:

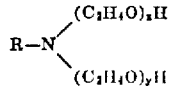

where R is an alkyl radical derived from coconut oil and x+y is 12. The conditioned strength of the yarn was 9.4 kg. The conditioned strength and the bone-dry strength of tire cord made from two such yarns were 14.9 and 18.2 kg., respectively.

Example VI

The process of Example I was repeated, except that the viscose contained 1.5% by weight (based on the cellulose in the viscose) of a compound having the formula:

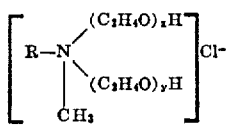

where R is an alkyl radical derived from coconut oil and x+y is 12, and 1.5% by weight (based on the cellulose in the viscose) of a compound having the formula:

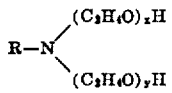

where R is an alkyl radical derived from coconut oil and x+y is 12. The conditioned strength of the yarn was 9.2 kg. The conditioned strength and the bone-dry strength of tire cord made from two such yarns were 14.8 and 18.0 kg., respectively.

Many modifications and changes within the scope of this invention will be apparent to those skilled in the art. Accordingly, the invention is intended to be limited only to the extent set forth in the following claims.

What is claimed is:

1. In a process for producing high tenacity rayon yarn, the combination which comprises:

(a) extruding a viscose containing at least one skin-producing modifier selected from the group consisting of an amine, a quaternary ammonium compound, a carbamate, a polyethylene glycol and an ether having a formula $$RO(CH_2CH_2O)_nR'$$

where R is selected from the group consisting of alkyl and aryl radicals, R' is selected from hydrogen, alkyl and aryl radicals and n is 1–4 in combination with a cation-active compound which counteracts an occurrence of spinning faults, said cation-active compound being selected from the group of laurylpyridinium chloride, stearylpyridinium chloride, dodecyltriethylammonium iodide and compounds having the formula

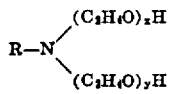

where R is an alkyl group having 8 to 24 carbon atoms and x+y is 5 to 25, (b) into a spin bath being maintained at 40–60° C. having a sulfuric acid content in percent by weight which is 0.83 to 0.95 times the total alkali content in percent by weight of the viscose, a sodium sulfate content of 11 to 15% by weight and a zinc sulfate content of 3 to 5% by weight, (c) successively stretching the yarn about 100% in a dilute sulfuric acid bath maintained at about 95° C., (d) adjusting the yarn to a pH of from 5 to 8.5 and collecting the yarn in the form of a cake, (e) unwinding the yarn from the cake, and (f) after-stretching the yarn about 10% and drying for a maximum of 20 minutes.

2. The process of claim 1 in which the pH of the yarn is attained by treating the yarn with water.

3. The process of claim 1 in which the pH of the yarn is attained by treating the yarn with an aqueous salt solution.

4. The process of claim 1 in which the pH of the yarn is attained by treating the yarn with an aqueous ammonia solution.

5. The process of claim 1 in which the yarn is dried while under tension.

6. The process of claim 1 in which the viscose contains as modifiers at least 0.5% by weight based on the cellulose in the viscose of polyethylene oxide and at least 0.5% by weight based on the cellulose in the viscose of a compound having the formula:

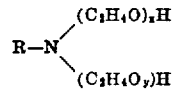

where R is an alkyl radical containing from 8 to 24 carbon atoms and x+y is 5–25.

7. The process of claim 1 in which the yarn is after-stretched about 10% and dried on a hot roller.

*8. In a process for producing high tenacity rayon yarn the combination which comprises:*

*(a) extruding a viscose containing at least one skin-producing modifier selected from the group consisting of an amine, a quaternary ammonium compound, a carbamate, a polyethylene glycol and an ether having the formula*

$$RO(CH_2CH_2O)_nR'$$

*where R is selected from the group consisting of alkyl and aryl radicals, R' is selected from hydrogen, alkyl and aryl radicals and n is 1–4;*

*(b) into a spin bath being maintained at 40–60° C. and having a sulfuric acid content in percent by weight which is 0.83 to 0.95 times the total alkali content in percent by weight of the viscose, a sodium sulfate content of 11 to 15% by weight, a zinc sulfate content of 3 to 5% by weight and including a cation-active compound being selected from the group of laurylpyridinium chloride, stearylpyridinium chloride, dodecyltriethylammonium iodide and compounds having the formula*

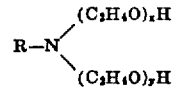

*where R is an alkyl group having 8–24 carbon atoms and x+y is 5 to 25;*

*(c) successively stretching the yarn about 100% in in a dilute sulfuric acid bath maintained at about 95° C.;*

*(d) adjusting the yarn to a pH of from 5–8.5 and collecting the yarn in the form of a cake;*

*(e) unwinding the yarn from the cake and,*

*(f) after-stretching the yarn about 10% and drying for a maximum of 20 minutes.*

References Cited

The following references, cited by the Examiner, are of record in the patent filed of this patent or the original patent.

UNITED STATES PATENTS

| | | | |
|---|---|---|---|
| 2,512,968 | 6/1950 | Ray | 264—197 |
| 2,611,928 | 6/1952 | Merion | 264—197 |
| 2,602,258 | 12/1952 | McLellan | 264—198 |
| 2,852,333 | 9/1958 | Cox et al. | 264—198 X |
| 2,914,376 | 9/1959 | Bibolet et al. | 264—198 X |
| 2,978,292 | 4/1961 | Limburg et al. | 264—194 X |

| | | | |
|---|---|---|---|
| 2,983,572 | 5/1961 | Elling et al. | 264—194 X |
| 3,007,766 | 11/1961 | Elssner et al. | 264—194 X |
| 3,046,082 | 7/1962 | Mitchell et al. | 264—194 X |
| 3,046,085 | 7/1962 | Burroughs et al. | 264—197 X |

JULIUS FROME, *Primary Examiner.*

J. H. WOO, *Assistant Examiner.*

U.S. Cl. *X.R.*

8—130.1; 106—165; 264—191, 192, 193, 194, 195